(12) United States Patent
Shetty

(10) Patent No.: US 11,244,269 B1
(45) Date of Patent: Feb. 8, 2022

(54) MONITORING AND CREATING CUSTOMIZED DYNAMIC PROJECT FILES BASED ON ENTERPRISE RESOURCES

(71) Applicant: West Corporation, Omaha, NE (US)

(72) Inventor: Santhosh Shetty, Omaha, NE (US)

(73) Assignee: West Corporation, Omaha, NE (US)

( * ) Notice: Subject to any disclaimer, the term of this patent is extended or adjusted under 35 U.S.C. 154(b) by 97 days.

(21) Appl. No.: 16/216,367

(22) Filed: Dec. 11, 2018

(51) Int. Cl.
*G06Q 10/06* (2012.01)
*G06Q 10/10* (2012.01)
*G06F 16/93* (2019.01)

(52) U.S. Cl.
CPC ... *G06Q 10/0635* (2013.01); *G06Q 10/06312* (2013.01); *G06Q 10/103* (2013.01); *G06F 16/93* (2019.01)

(58) Field of Classification Search
None
See application file for complete search history.

(56) References Cited

U.S. PATENT DOCUMENTS

| | | | | |
|---|---|---|---|---|
| 7,506,312 B1 * | 3/2009 | Girolami-Rose | ......... | G06F 8/71 717/101 |
| 8,046,755 B2 * | 10/2011 | Gaa-Frost | ................. | G06F 8/60 717/177 |
| 8,352,237 B2 * | 1/2013 | Bassin | .................... | G16H 50/30 703/22 |
| 8,370,193 B2 * | 2/2013 | Saraf | ...................... | G06Q 10/00 705/7.36 |
| 8,543,438 B1 * | 9/2013 | Fleiss | ................. | G06Q 10/0631 705/7.13 |
| 8,566,805 B2 * | 10/2013 | Bassin | ................... | G06Q 10/06 717/135 |
| 8,645,921 B2 * | 2/2014 | Bassin | ............... | G06Q 10/0635 717/127 |
| 8,667,458 B2 * | 3/2014 | Bassin | ................ | G06F 11/3616 717/102 |
| 8,893,086 B2 * | 11/2014 | Bassin | ............. | G06Q 10/06312 717/124 |
| 9,104,997 B1 * | 8/2015 | Balasubramanian | .. | G06Q 50/01 |

(Continued)

FOREIGN PATENT DOCUMENTS

| | | | | |
|---|---|---|---|---|
| AU | 2016200021 B2 * | 8/2017 | ........... | G06Q 10/063 |
| AU | 2018201941 A1 * | 10/2018 | .......... | G06F 11/3688 |

(Continued)

OTHER PUBLICATIONS

Boegh, Jorgen, et al. "A method for software quality planning, control, and evaluation." IEEE software 16.2 (1999): 69-77. (Year: 1999).*

(Continued)

*Primary Examiner* — Matthew S Gart
*Assistant Examiner* — Derick J Holzmacher

(57) ABSTRACT

One example method of operation may include identifying project files in a database, identifying one or more active project files and one or more inactive project files from the project files, retrieving one or more of the inactive project files, identifying one or more project risk metrics associated with the one or more inactive project files, and determining potential project risk metrics associated with the one or more active project files based on the one or more project risk metrics associated with the one or more inactive project files.

11 Claims, 11 Drawing Sheets

(56) References Cited

U.S. PATENT DOCUMENTS

| | | | | |
|---|---|---|---|---|
| 9,292,421 | B2* | 3/2016 | Bassin | G06F 11/3684 |
| 9,588,876 | B2* | 3/2017 | Swierc | G06F 11/3668 |
| 9,594,671 | B2* | 3/2017 | Bassin | G06Q 10/06312 |
| 9,916,133 | B2* | 3/2018 | Jubran | G06F 8/77 |
| 2004/0204972 | A1* | 10/2004 | Anant | G06Q 10/06375 |
| | | | | 705/7.28 |
| 2008/0077530 | A1* | 3/2008 | Banas | G06Q 10/06313 |
| | | | | 705/50 |
| 2008/0256505 | A1* | 10/2008 | Chaar | G06F 8/10 |
| | | | | 717/100 |
| 2009/0070734 | A1* | 3/2009 | Dixon | G06F 8/71 |
| | | | | 717/102 |
| 2010/0017252 | A1* | 1/2010 | Chaar | G06Q 10/0631 |
| | | | | 705/7.12 |
| 2010/0031090 | A1* | 2/2010 | Bernardini | G06F 11/366 |
| | | | | 714/38.14 |
| 2011/0066420 | A1* | 3/2011 | Bassin | A61B 5/7275 |
| | | | | 703/22 |
| 2011/0066486 | A1* | 3/2011 | Bassin | G06Q 10/103 |
| | | | | 705/14.43 |
| 2011/0066490 | A1* | 3/2011 | Bassin | G06Q 30/0249 |
| | | | | 705/14.48 |
| 2011/0066557 | A1* | 3/2011 | Bassin | G06F 11/3616 |
| | | | | 705/301 |
| 2011/0066558 | A1* | 3/2011 | Bassin | G06Q 10/067 |
| | | | | 705/301 |
| 2011/0066887 | A1* | 3/2011 | Bassin | G06F 11/3672 |
| | | | | 714/27 |
| 2011/0066890 | A1* | 3/2011 | Bassin | G06F 11/3672 |
| | | | | 714/37 |
| 2011/0066893 | A1* | 3/2011 | Bassin | G06F 8/70 |
| | | | | 714/38.1 |
| 2011/0067005 | A1* | 3/2011 | Bassin | G06F 11/008 |
| | | | | 717/127 |
| 2011/0067006 | A1* | 3/2011 | Baker | G06F 9/44589 |
| | | | | 717/127 |
| 2013/0041704 | A1* | 2/2013 | Girard | G06Q 10/06 |
| | | | | 705/7.11 |
| 2013/0041711 | A1* | 2/2013 | Girard | G06Q 50/165 |
| | | | | 705/7.28 |
| 2015/0227868 | A1* | 8/2015 | Saraf | G06Q 10/0635 |
| | | | | 705/7.28 |
| 2015/0227869 | A1* | 8/2015 | Saraf | G06Q 10/0635 |
| | | | | 705/7.28 |
| 2015/0242971 | A1* | 8/2015 | Girard | G06Q 10/0635 |
| | | | | 705/7.28 |
| 2016/0203434 | A1* | 7/2016 | Sivakumar | G06Q 10/063118 |
| | | | | 705/7.14 |
| 2016/0224908 | A1* | 8/2016 | Jagannathan | G06Q 10/063 |
| 2016/0283893 | A1* | 9/2016 | Dhiman | G06F 8/20 |
| 2016/0364675 | A1* | 12/2016 | Sharma | G06Q 10/1097 |
| 2017/0132546 | A1* | 5/2017 | Ray | G06Q 10/06313 |
| 2017/0269921 | A1* | 9/2017 | Martin Vicente | G06F 8/61 |
| 2017/0357565 | A1* | 12/2017 | Ledet | G06F 8/73 |
| 2018/0307481 | A1* | 10/2018 | Ganesan | G06F 16/254 |
| 2018/0349135 | A1* | 12/2018 | Burns | G06F 8/70 |

FOREIGN PATENT DOCUMENTS

| | | | | |
|---|---|---|---|---|
| WO | WO-2007041242 | A2* | 4/2007 | G06F 11/3616 |
| WO | WO-2017218709 | A1* | 12/2017 | G06Q 10/103 |

OTHER PUBLICATIONS

Jones, Capers. "Software sizing." IEE review 45.4 (1999): 165-167. (Year: 1999).*

Jones, Capers. "Software change management." Computer 29.2 (1996): 80-82. (Year: 1996).*

* cited by examiner

MONITORING AND CREATING CUSTOMIZED DYNAMIC PROJECT FILES BASED ON ENTERPRISE RESOURCES

TECHNICAL FIELD OF THE APPLICATION

This application relates to monitoring and management of enterprise resources, and more specifically to monitoring ongoing project files and creating customize dynamic project files based on enterprise resources.

BACKGROUND OF THE APPLICATION

Conventionally, certain organizations set out to complete a project by creating a few project notations in a project file, such as the project manager, other project personnel, a few location and capital resources, and other information generally pertaining to finance and deadlines. The information is saved in a project file, updated periodically, and is otherwise static and unreliable when it comes to the real world of project management. Additionally, the projects within an organization may have large-scale overlap, where certain resources are shared among projects with no established rules or priorities with regard to avoiding failure and maximizing success rates.

In any organization, there may be various project teams which can be tracked with software applications that define the more important parameters and assist with realizing the likelihood of success with regard to budget, personnel requirements, resource requirements, deliverables/milestones, and deadlines. Many projects run in parallel in terms of resources and timelines, failure is an inevitable result all organizations must face and attempt to avoid. Identifying which projects are at risk of failure at any given time may alleviate the likelihood that those projects will actually fail due to missed deadlines and/or a lack of resources. Identifying such information as early in the project lifecycle as possible would provide risk reducing potential.

Also, when project teams are created, the managers may attempt to identify all such available resources to fill any potential gaps in the predicted lifecycle of the project. The conflicts with scheduling and assignment of resources may be difficult to avoid, the knowledge available to the project managers across the board may be limited and may create conflicts and disagreements with managers and their superiors. The more information available to accurately compare and contrast projects within an organization may benefit all projects across the board and optimize success rates for an overall increase in yearly performance for the organization as a whole.

SUMMARY OF THE APPLICATION

Example embodiments of the present application provide at least a method that includes at least one of identifying a plurality of project files in a database, identifying one or more active project files and one or more inactive project files from the plurality of project files, retrieving one or more of the inactive project files, identifying one or more project risk metrics associated with the one or more inactive project files; and determining potential project risk metrics associated with the one or more active project files based on the one or more project risk metrics associated with the one or more inactive project files.

Another example embodiment may include an apparatus that includes a memory that stores project files in a database, and a processor configured to identify a plurality of project files in the database, identify one or more active project files and one or more inactive project files from the plurality of project files, retrieve one or more of the inactive project files, identify one or more project risk metrics associated with the one or more inactive project files, and determine potential project risk metrics associated with the one or more active project files based on the one or more project risk metrics associated with the one or more inactive project files.

Still another example embodiment includes a non-transitory computer readable storage medium configured to store instructions that when executed cause a processor to perform identifying a plurality of project files in a database, identifying one or more active project files and one or more inactive project files from the plurality of project files, retrieving one or more of the inactive project files, identifying one or more project risk metrics associated with the one or more inactive project files, and determining potential project risk metrics associated with the one or more active project files based on the one or more project risk metrics associated with the one or more inactive project files.

Yet another example embodiment includes a method that includes at least one of identifying a plurality of active project files in a database, identifying one or more deliverables included in the plurality of active project files, performing a simulation test based on a current set of allocated resources and a current set of deadlines associated with each of the one or more deliverables to determine whether the one or more deliverables will fail, determining the one or more deliverables comprises one or more failed project risk metrics indicating that the one or more deliverables will fail to be completed by a corresponding deadline among the current set of deadlines, selecting one or more of the active project files which does not have a failed project risk metric, and reallocating resources, from the one or more of the active project files which does not have a failed project risk metric, to one or more of the active project files which has one or more failed project risk metrics.

Yet another example embodiment includes an apparatus that includes a memory that stores data in a database, and a processor configured to identify a plurality of active project files in the database, identify one or more deliverables included in the plurality of active project files, perform a simulation test based on a current set of allocated resources and a current set of deadlines associated with each of the one or more deliverables to determine whether the one or more deliverables will fail, determine the one or more deliverables comprises one or more failed project risk metrics indicating that the one or more deliverables will fail to be completed by a corresponding deadline among the current set of deadlines, select one or more of the active project files which does not have a failed project risk metric, and reallocate resources, from the one or more of the active project files which does not have a failed project risk metric, to one or more of the active project files which has one or more failed project risk metrics.

Yet another example embodiment may include a non-transitory computer readable storage medium configured to store instructions that when executed cause a processor to perform identifying a plurality of active project files in a database, identifying one or more deliverables included in the plurality of active project files, performing a simulation test based on a current set of allocated resources and a current set of deadlines associated with each of the one or more deliverables to determine whether the one or more deliverables will fail, determining the one or more deliverables comprises one or more failed project risk metrics indicating that the one or more deliverables will fail to be completed by a corresponding deadline among the current set of deadlines, selecting one or more of the active project files which does not have a failed project risk metric, and reallocating resources, from the one or more of the active project files which does not have a failed project risk metric, to one or more of the active project files which has one or more failed project risk metrics.

And yet another example embodiment may include at least one of identifying a project file stored in a database, the project file being registered to an organization, identifying a deliverable assigned to the project file, and the deliverable comprises deliverable requirements, determining resource requirements comprising types of resources and an amount of resources required to achieve the deliverable requirements, determining available resources at the registered organization from a pool of resources, comparing the available resources to the resource requirements, identifying available matches from available resources which match the types of resource requirements, and assigning each of the available matches to the project file as full matches or partial matches depending on a weight assigned to each of the available matches.

Still yet another example embodiment may include an apparatus that includes a memory that stores project files in a database, a processor configured to identify a project file stored in the database, the project file being registered to an organization, identify a deliverable assigned to the project file, wherein the deliverable comprises deliverable requirements, determine resource requirements comprising types of resources and an amount of resources required to achieve the deliverable requirements, determine available resources at the registered organization from a pool of resources, compare the available resources to the resource requirements, identify available matches from available resources which match the types of resource requirements, and assign each of the available matches to the project file as full matches or partial matches depending on a weight assigned to each of the available matches.

Still yet another example embodiment may include a non-transitory computer readable storage medium configured to store instructions that when executed causes a processor to perform identifying a project file stored in a database, the project file being registered to an organization, identifying a deliverable assigned to the project file, wherein the deliverable comprises deliverable requirements, determining resource requirements comprising types of resources and an amount of resources required to achieve the deliverable requirements, determining available resources at the registered organization from a pool of resources, comparing the available resources to the resource requirements, identifying available matches from available resources which match the types of resource requirements, and assigning each of the available matches to the project file as full matches or partial matches depending on a weight assigned to each of the available matches.

Still yet another example embodiment may include a method that includes at least one of identifying a plurality of project files stored in a database, determining current project scores assigned to the plurality of project files, selecting a lowest scored project file with a lowest assigned project score, identifying one or more types of resources assigned to the project file with the lowest score, identifying the highest scored project file and the types of resources assigned to the highest scored project file, determining whether any of the types of resources assigned to the highest scored project file match any of the types of resources assigned to lowest scored project, and when one or more types of resources assigned to the highest scored project file match the types of resources assigned to the lowest scored project, assigning one or more of the matched resources of the highest scored project file to the lowest scored project.

Still yet another example embodiment may include an apparatus that includes a memory that stores project files in a database, and a processor configured to identify a plurality of project files stored in the database, determine current project scores assigned to the plurality of project files, select a lowest scored project file with a lowest assigned project score, identify one or more types of resources assigned to the project file with the lowest score, identify the highest scored project file and the types of resources assigned to the highest scored project file, determine whether any of the types of resources assigned to the highest scored project file match any of the types of resources assigned to lowest scored project, and when one or more types of resources assigned to the highest scored project file match the types of resources assigned to the lowest scored project, assign one or more of the matched resources of the highest scored project file to the lowest scored project.

Still yet another example embodiment may include a non-transitory computer readable storage medium configured to store instructions that when executed cause a processor to perform identifying a plurality of project files stored in a database, determining current project scores assigned to the plurality of project files, selecting a lowest scored project file with a lowest assigned project score, identifying one or more types of resources assigned to the project file with the lowest score, identifying the highest scored project file and the types of resources assigned to the highest scored project file, determining whether any of the types of resources assigned to the highest scored project file match any of the types of resources assigned to lowest scored project, and when one or more types of resources assigned to the highest scored project file match the types of resources assigned to the lowest scored project, assigning one or more of the matched resources of the highest scored project file to the lowest scored project.

DETAILED DESCRIPTION OF THE APPLICATION

Figure 1:
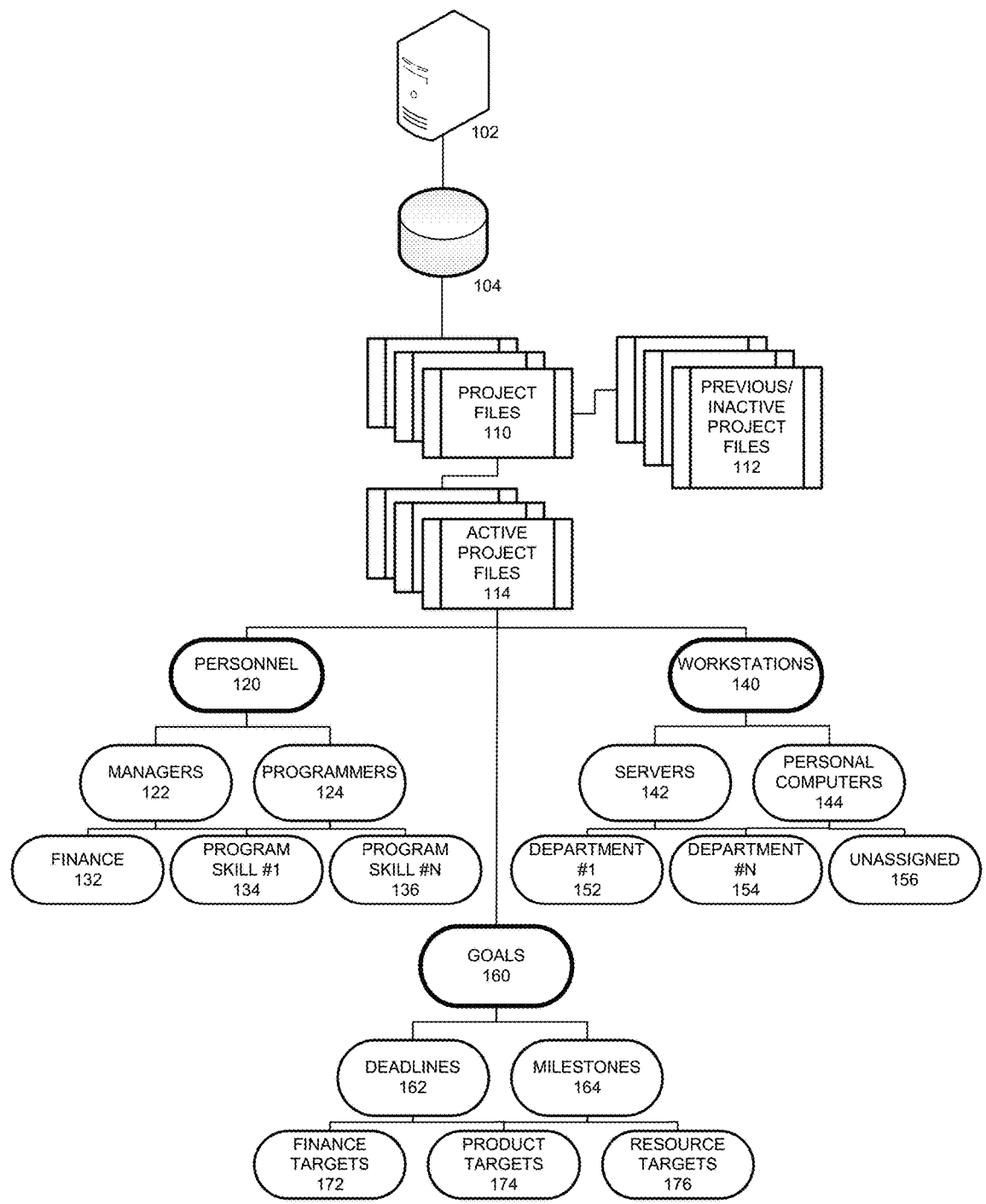
FIG. 1 illustrates an example system network diagram of project files and corresponding project attributes according to example embodiments.

It will be readily understood that the components of the present application, as generally described and illustrated in the figures herein, may be arranged and designed in a wide variety of different configurations. Thus, the following detailed description of the embodiments of a method, apparatus, and system, as represented in the attached figures, is not intended to limit the scope of the application as claimed, but is merely representative of selected embodiments of the application.

The features, structures, or characteristics of the application described throughout this specification may be combined in any suitable manner in one or more embodiments. For example, the usage of the phrases "example embodiments", "some embodiments", or other similar language, throughout this specification refers to the fact that a particular feature, structure, or characteristic described in connection with the embodiment may be included in at least one embodiment of the present application. Thus, appearances of the phrases "example embodiments", "in some embodiments", "in other embodiments", or other similar language, throughout this specification do not necessarily all refer to the same group of embodiments, and the described features, structures, or characteristics may be combined in any suitable manner in one or more embodiments.

In addition, while the term "message" has been used in the description of embodiments of the present application, the application may be applied to many types of network data, such as, packet, frame, datagram, etc. For purposes of this application, the term "message" also includes packet, frame, datagram, and any equivalents thereof. Furthermore, while certain types of messages and signaling are depicted in exemplary embodiments of the application, the application is not limited to a certain type of message, and the application is not limited to a certain type of signaling.

Example embodiments provide for project management in an enterprise organization. In one example, various different projects may be identified by a project name/title, assigned attributes or assets, such as location, staff members, personnel work functions, floor space, capital equipment, workstations, servers, etc., and any other common project attributes which are in a limited capacity and which may be designated to a particular project via a project file. The project files may be stored in a database of a server and accessed for reference purposes, update purposes and/or comparison purposes. Previously completed projects may be used as baselines for active or soon to be active projects by identifying successful project management criteria that enabled past projects to be successful. Projects may have established deliverables and deadlines as variables which can be quantified and compared to the project resources to determine a likelihood of success. When projects are identified as being successful or having a likelihood of success based on certain resources required to achieve those success parameters, then those projects can be allocated resources necessary to achieve those success goals. Resources may be in a pool of available resources and/or in other projects with excess resources which can be scored and used as a basis to reallocate resources accordingly to other projects.

FIG. 1 illustrates an example system network diagram of project files and corresponding project attributes according to example embodiments. Referring to FIG. 1, the configuration 100 includes a network of a server(s) 102 and database 104 which stores the project files 110. Among the project files 110 are previous/inactive project files 112 from past completed or abandoned projects and active project files 114 from upcoming, currently active and/or ongoing projects. Within the project files are project attributes or identifiers which identify the staff or personnel 120, which are labeled by their job titles/work functions, such as finance 132, management 122, senior programmers 124, and other skilled workers, such as information technology experts, sub-skilled programmers 134/136, which are labeled by the programming language or weighted functions for which languages they are familiar along with a weighted rating (e.g., 1-5) to identify their skill level. Other skill functions of a project may include manufacturers, contractors, etc.

The project assets/instruments/capital may include workstations 140, servers 142, personal computers 144, departments 152/154, such as building sections or rooms, resource locations, such as assembly lines or manufacturing facilities, server farms, dedicated cloud facilities, etc. Certain resources may be unassigned 156 but may require a certain level of commitment for unexpected capital required to complete a project, such as contractor services, marketing efforts, additional floor space, etc. Additional project attributes may include the quantified or numerical parameters used to demonstrate the project objectives/goals 160, such as a deadline 162, milestones/deliverables 164, those may include budgetary finance targets 172, product targets 174, such as 10,000 lines of software code needed to complete a software project, and resource targets 176, such as expected capital to finish a project.

Figure 2A:
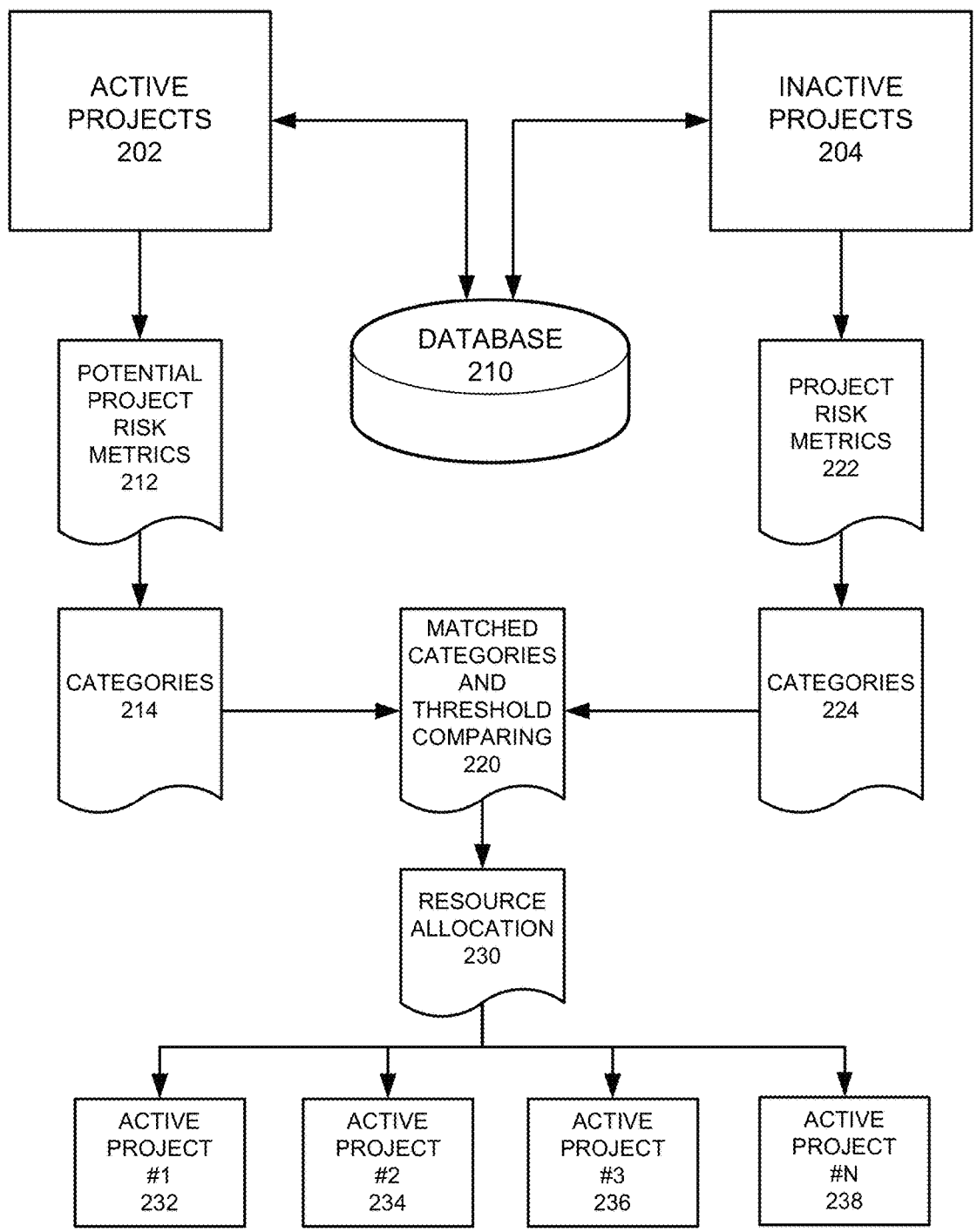
FIG. 2A illustrates an example project risk identification configuration according to example embodiments.

FIG. 2A illustrates an example project risk identification configuration according to example embodiments. The configuration 200 provides a database 210 which stores the active projects 202 and the inactive projects 204. In the inactive projects 204, the already completed efforts may have one or more known project risks metrics 222 which were identified during the project lifecycle and may be stored as project risk metrics 222 in a readily identifiable portion of the project data. In the active projects 202, the potential project risk metrics 212 may be determined prior to any identified failures having occurred as a preventative effort to determine the potential risks before they occur. Any of the risks may be linked to a particular category 214/224, such as deadlines, a specific estimated number of product outputs, a specific estimated number of lines of code necessary to be created to build such a software product deliverable, etc.

When the categories match between an active project and an inactive project, then the matched categories can be quantified to a threshold value to determine a likelihood of a valid risk metric and a potential for failure. For example, if an inactive project had a deadline of 180 days from start to finish and a deliverable of 10,000 lines of code as an estimated work product deliverable effort, and a certain number of programmers assigned to the project, and a certain number of workstations assigned to the project, and the project failed, then the similar categories of the active project may be deemed at risk, especially when those noted categories and specific allocation values in the active project are within a set distance/magnitude of the noted categories and specific allocation values of the inactive project with known success or failures. The thresholds may be set for both projects based on similar categories, and when a particular category of an active project is within 90 percent of a value of the inactive project and the deliverable failed to be delivered and/or on time, then the 10 percent distance value may represent an actual project risk metric for the active project being compared. The Threshold comparison values 220 may yield a potential risk when the active project has a threshold deliverable (e.g., deadline, number of lines of code, etc.) that is within 10 percent of the inactive project with known failures.

Additionally, all active projects 232-238 may be identified in a resource allocation/reallocation procedure 230 that identifies which of any active projects have project risk metrics that are likely to cause a project failure, such as a failure to deliver a deliverable based on deliverable requirements and/or a deliverable deadline date. The projects with risk metrics indicating a project failure is likely based on a current project allocation of resources may require a reallocation of resources and/or changes to the current project goals/requirements. One example may include extending a deadline automatically to provide additional time given a current allocation or resources. Another example may include an automatic reallocation of project resources from another project with a lower risk metric value or no risk metric value currently pending.

Figure 2B:
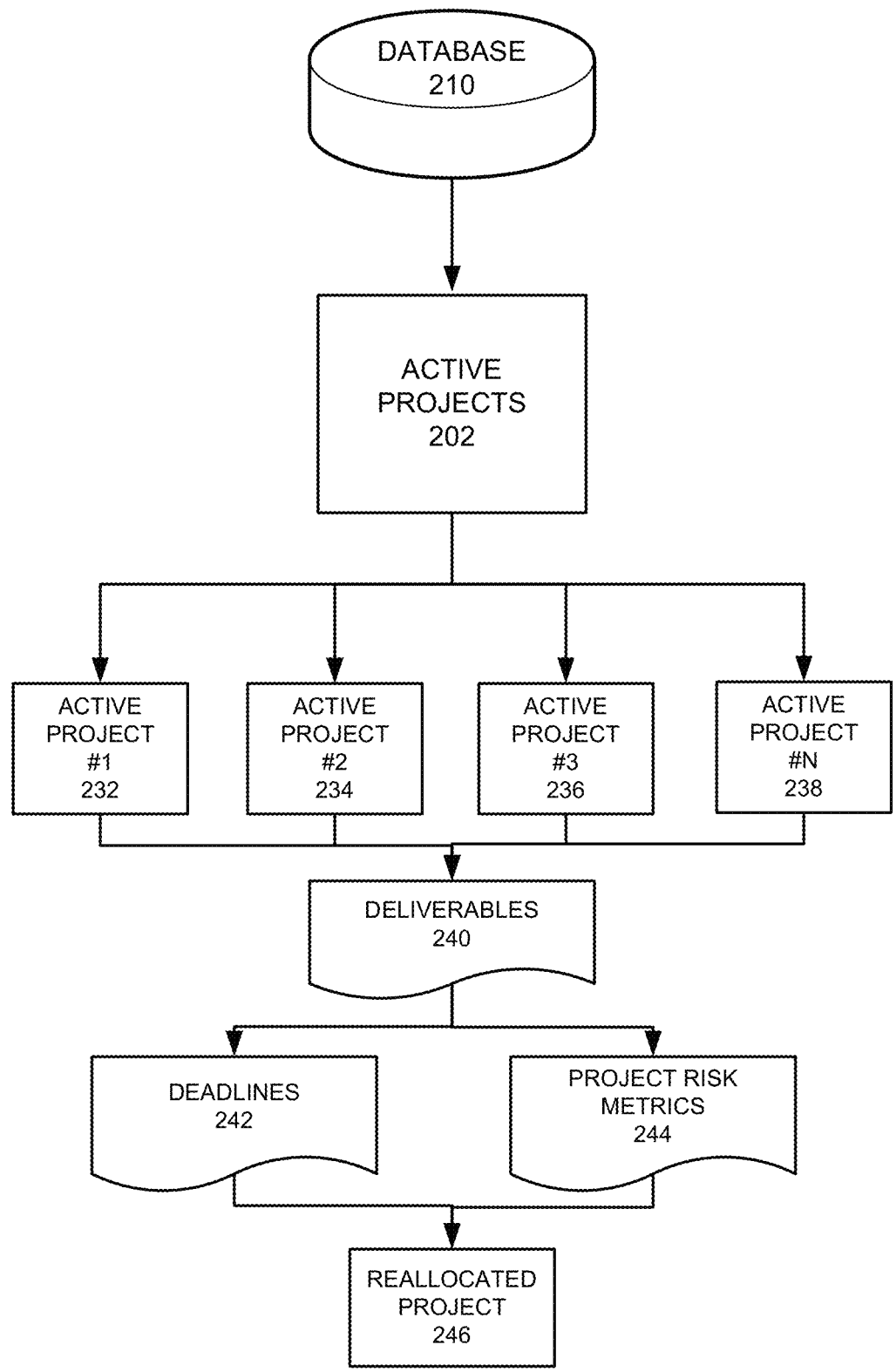
FIG. 2B illustrates an example project attributes management configuration according to example embodiments.

FIG. 2B illustrates an example project attributes management configuration according to example embodiments. Referring to FIG. 2B, the configuration 250 includes an example where the active projects 202 are identified as a group of projects 232-238. The deliverables 240 are identified for all projects, including deadlines 242 and project risk metrics 244. The total risk metrics may cause a scoring modification to a projects overall score. For example, a project may be initiated with a value of 100. Deadlines and known risk metrics based on previous projects with similar categories and requirements may cause the value to be reduced. All scores for all projects may be compared and those with lower scores may be afforded reallocation of project resources 246 from other higher scored projects. Each time a project is changed to remove resources or add resources, the project's success score is recalculated for new reallocated project values 246.

Figure 3A:
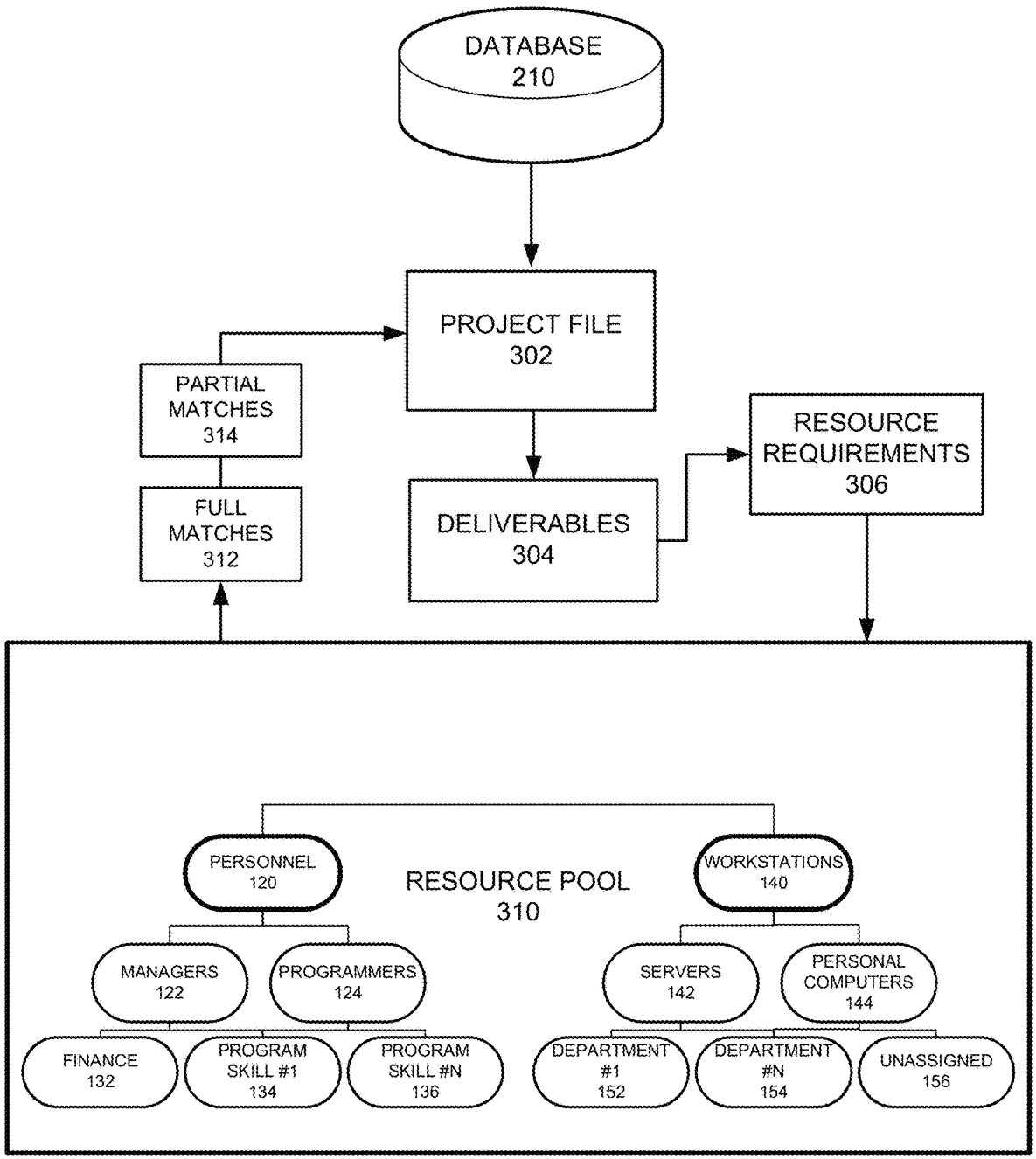
FIG. 3A illustrates an example project allocation configuration and resource pool according to example embodiments.

FIG. 3A illustrates an example project allocation configuration and resource pool according to example embodiments. In this example, the configuration 300 provides a scenario where a single project file 302 is being examined for deliverables 304 and resource requirements 306 to fulfill the deliverables 304. In this example, in order to provide a set of software resources for a software application project that requires a particular software application to be created based on a certain amount of computing resources, programmer resources, and which has a deadline and a certain project requirements, the project may have its deadline and deliverable product parameters created as initial project file parameters. The resource pool 310 may include any of the resources available by the organization managing the project. The resources can be selected by an automated tool that identifies a category of the project, such as a software project and basic requirements, such as personnel 120, programmers 124, skill sets 134/136, a number of workstations 140, etc. The estimated resources may be based on a comparison of the active project file with a previous project file that had a similar deliverable and/or project category. The score assigned to the active project can be based on the comparison as well. The score may change every time a deliverable and deadline occur. As project goals are met, the score may increase and as project goals are failed, the score may decrease. The selections may be full matches 312 and/or partial matches 314.

Figure 3B:
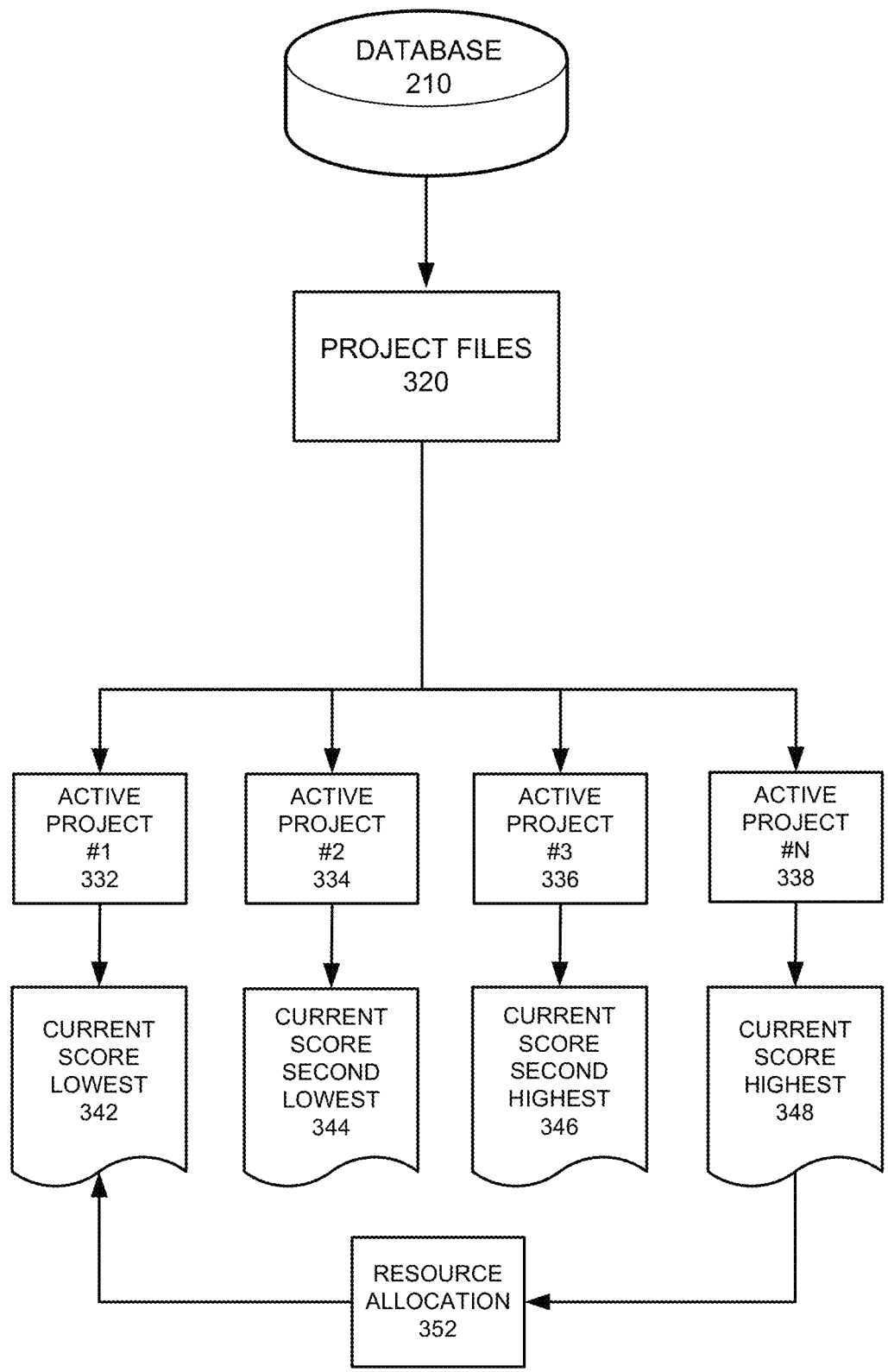
FIG. 3B illustrates an example project scoring and comparison configuration according to example embodiments.

FIG. 3B illustrates an example project scoring and comparison configuration according to example embodiments. Referring to FIG. 3B, the example configuration 350 includes a set of project files 320 which are examined for current project scores which are currently assigned. One approach to optimizing the project files for optimum organization output would be to identify the lowest scored project 342 and the highest scored project 348. The lowest scored project could be a direct recipient for resources allocated 352 from the highest scored project 348. The resources of those projects would be identified and compared to determine whether the resources match. An incremental resource, assuming a match has occurred, could then be apportioned to the lowest scored project 342 and then a rescoring event could occur to identify those current scores of the current active projects 332-338.

One approach may then be to reexamine the project scores and identify the lowest scored project which may be different from the previous example. In this case, the lowest scored project would may be project score 344 since the previous project score of project #1 332 may not be the lowest score any longer. The approach may then be to identify the highest scored project but exclude any projects which were last to provide an allocation, this provides an alternation between the last highest scored project #N 338 which had the last highest score 348. This way, the particular project which just lost a resource will be excluded from the second round of resource allocation and the next highest scored project, which may be project #2 336 in this example since the previously highest scored project 338 has lost resources, can then be used as a basis for allocation. However, in a third allocation round, the project 338 may be used as the basis for a reallocation since it did not lose resources in the last round of reallocation. The objective is to continue the allocation and reallocation until the entire set of project files have scores within a threshold percentage deviation from one another (i.e., 5 percent).

Figure 4A:
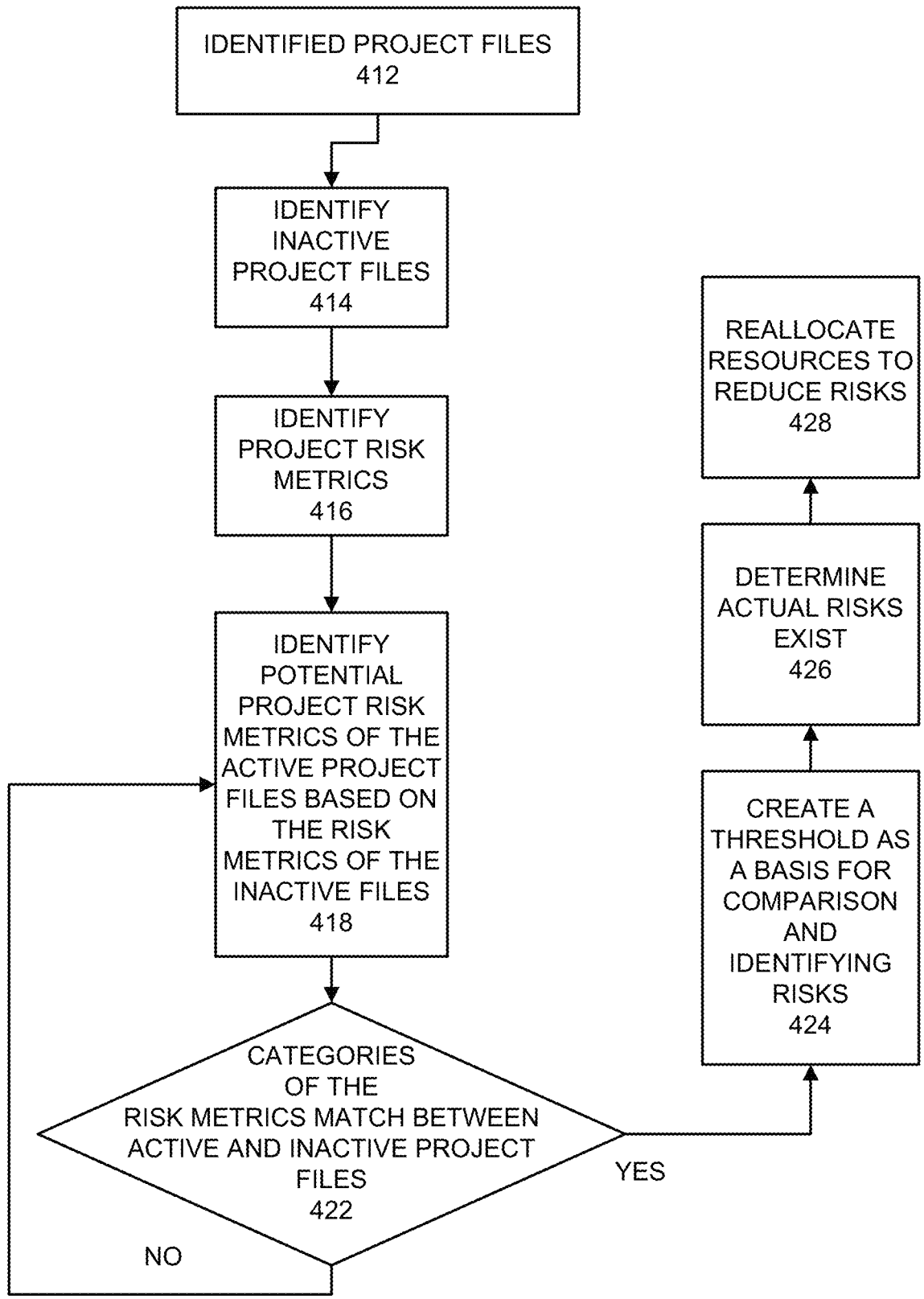
FIG. 4A illustrates an example flow diagram of a project risk management configuration according to example embodiments.

FIG. 4A illustrates an example flow diagram of a project risk management configuration according to example embodiments. Referring to FIG. 4A, the example method 400 may include a process of identifying potential project risks between active projects and inactive projects with proven risks from previous project cycles. In one example, various inactive projects that were previously completed are identified, then one or more current projects are compared to the previously completed projects which include successes and failures, but which also include specific risk metrics which were assigned to those projects during the project lifecycles. A weighted element (We) of one or more project resources of the active project and the risk metrics that need to be calculated are the parameters of interest when evaluating the projects. The higher the weighted elements are which are part of resources linked to a project, the higher the project's overall score will be when measuring project success scores. The risk metrics are categorized, such as a risk metric for a low budget, a risk metric for enough senior coders, and a risk metric for a deadline, etc. This enables project scoring and ultimately reallocation of project resources during a risk assessment.

The flow diagram 400 may include identifying a plurality of project files in a database 412, the project files may represent active projects, inactive projects, etc. The inactive project files 414 are identified first to determine which ones are inactive instead of which ones are active. The project risk metrics which were identified on those project files 416 are then selected and examined to identify potential project risk metrics of the active project files by comparing project categories 418 and related project information. When certain categories between the inactive files and the active files are identified as the same 422, a threshold may be established for both the projects as a basis for comparison purposes. For example, if the inactive project had a 10,000 lines of code estimated deliverable with a 30-weighted programmer requirement (e.g., programmers ranked 1-5 must total 30), then the thresholds for the inactive project are 10,000 lines of code and a 30-weighted programmer requirement. In the active project files, if the deliverable is 9,000 lines of code and the programmer requirement was a 20-weighted programmer requirement it may be observed that the 9,000 line threshold may be within a reasonable distance of the 10,000 line threshold and is thus the same for comparison purposes (e.g., 10 percent deviation or less between the thresholds). In this case, the risk metric is created to identify a likelihood of failure since the project deliverables are the same but the 20-weighted programmer requirement is much too small compared to the 30-weighted programmer requirement. As are result, the thresholds 424 identify that actual risks exist 426 and the resources must be reallocated to reduce risks 428.

Additional operations of the example method may include identifying a category of the one or more project risk metrics, and comparing the identified category to a category of the one or more potential project risk metrics, determining a threshold associated with the identified category that is within a predefined range of a threshold associated with the category of the one or more potential project risk metrics, and responsive to determining the threshold associated with the identified category is within a predefined range of the threshold associated with the category of the one or more potential project risk metrics, designating the one or more potential project risk metrics as an actual project risk metric. The method may also provide selecting one or more of the active project files, other than the active project file that include the actual project risk metric, and selecting one or more resources from the selected one or more active project files to reassign to the active project file that include the actual project risk metric. The method may also include removing the one or more resources from the selected one or more active project files, and reassigning the one or more resources to the active project file that includes the actual project risk metric. The plurality of project files may include one or more of each of a deadline and a deliverable, and the inactive project files are previously completed projects with at least one of one or more completed deliverables and one or more uncompleted deliverables.

Figure 4B:
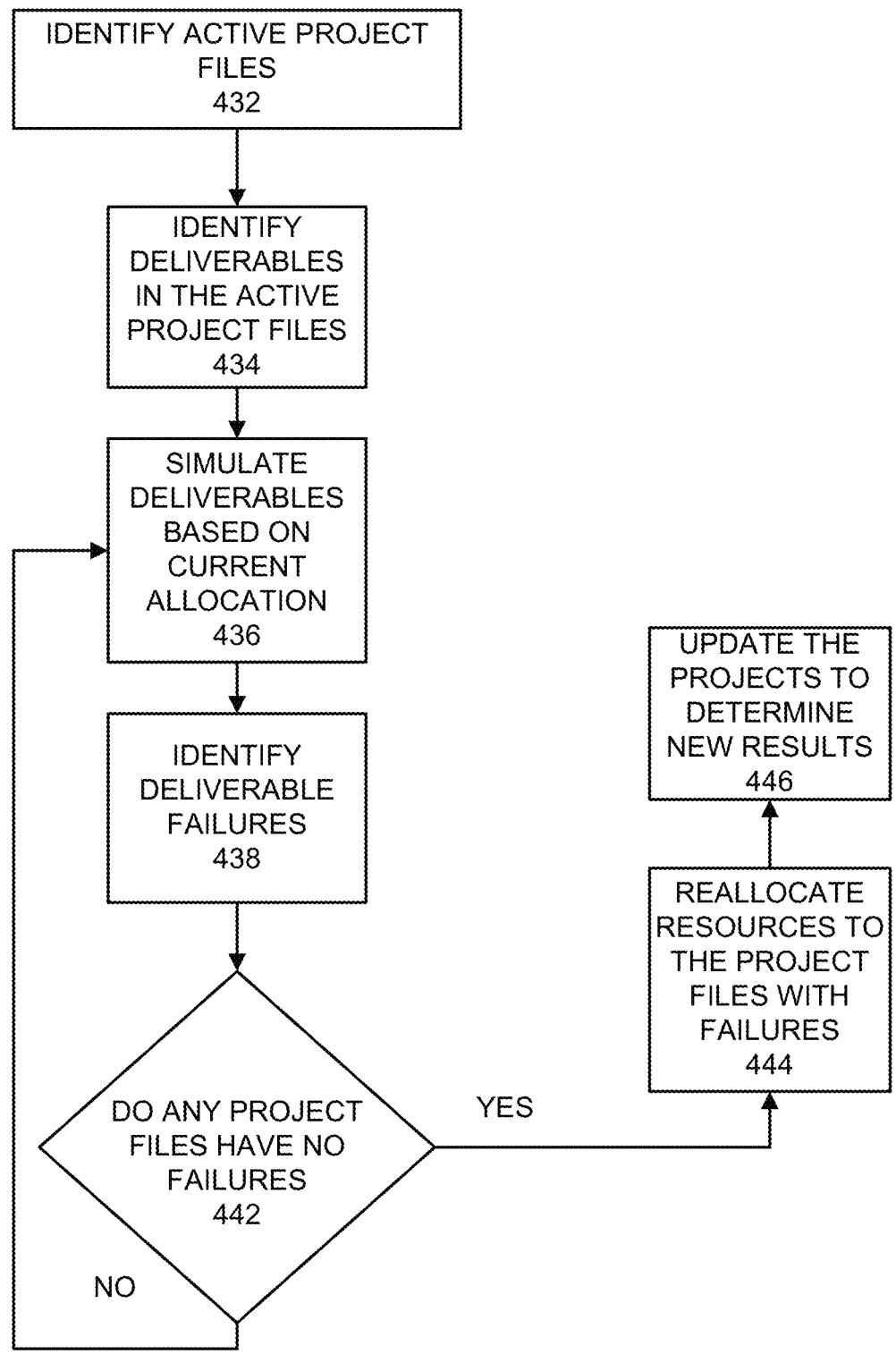
FIG. 4B illustrates an example flow diagram of a project attribute management configuration according to example embodiments.

FIG. 4B illustrates an example flow diagram of a project attribute management configuration according to example embodiments. Referring to FIG. 4B, the example method of operation 430 provides identifying certain active project files 432. The deliverables for those active projects are identified 434 and the potential failures due to outstanding or identified metrics are also identified. The deliverables are simulated 436 by identifying the deadlines and the requirements associated with the deliverables. A simulation may include a function of the deadline, the deliverable requirements and a similar inactive project with similar deliverable requirements. The success or lack of success of the inactive project(s) will provide a basis for the simulation to identify the deliverable failures 438.

By taking the set of active projects, and stress testing those projects in the simulation, the inactive projects with similar deliverables may provide established rules that have thresholds and value ranges that are known to have caused certain failures. One example may include a certain type of software project requirement (e.g., lines of code estimated) and a certain turnaround deadline (e.g., 120 days, etc.). The failures are noted and the associated projects are then compared to consider an reallocation of project resources among one another until the projects are setup for increased chances of success. The method may also provide determining that the one or more deliverables include one or more failed project risk metrics indicating that the one or more deliverables will fail to be completed by a corresponding deadline among the current set of deadlines 442. When comparing other active projects to one another, the process may also include selecting one or more of the active project files which does not have a failed project risk metric, and reallocating resources, from the one or more of the active project files which does not have a failed project risk metric, to one or more of the active project files which has one or more failed project risk metrics 444. The projects can then be updated to recalculate the new project success scores 446.

When performing a simulation test based on a current set of allocated resources and a current set of deadlines associated with each of the one or more deliverables, the process may perform determining a threshold to assign to the one or more deliverables based on a work value assigned to the deliverable and a deadline assigned to the deliverable. The threshold includes a function of the work value assigned to the deliverable and a number of days until the deadline. The method may also include comparing the threshold to a known threshold stored in memory, and the known threshold includes a maximum success value identified from a previous deliverable associated with a previously completed project. When the threshold is less than or equal to the known threshold, the method may perform determining the deliverable has a successful project risk metric, and when the threshold is greater than the known threshold, the method may perform determining the deliverable has an unsuccessful project risk metric. The work value assigned to the deliverable may be a number of units and a number of lines of software code, and the deadline assigned to the deliverable may include a fixed number of days from the current date.

Figure 4C:
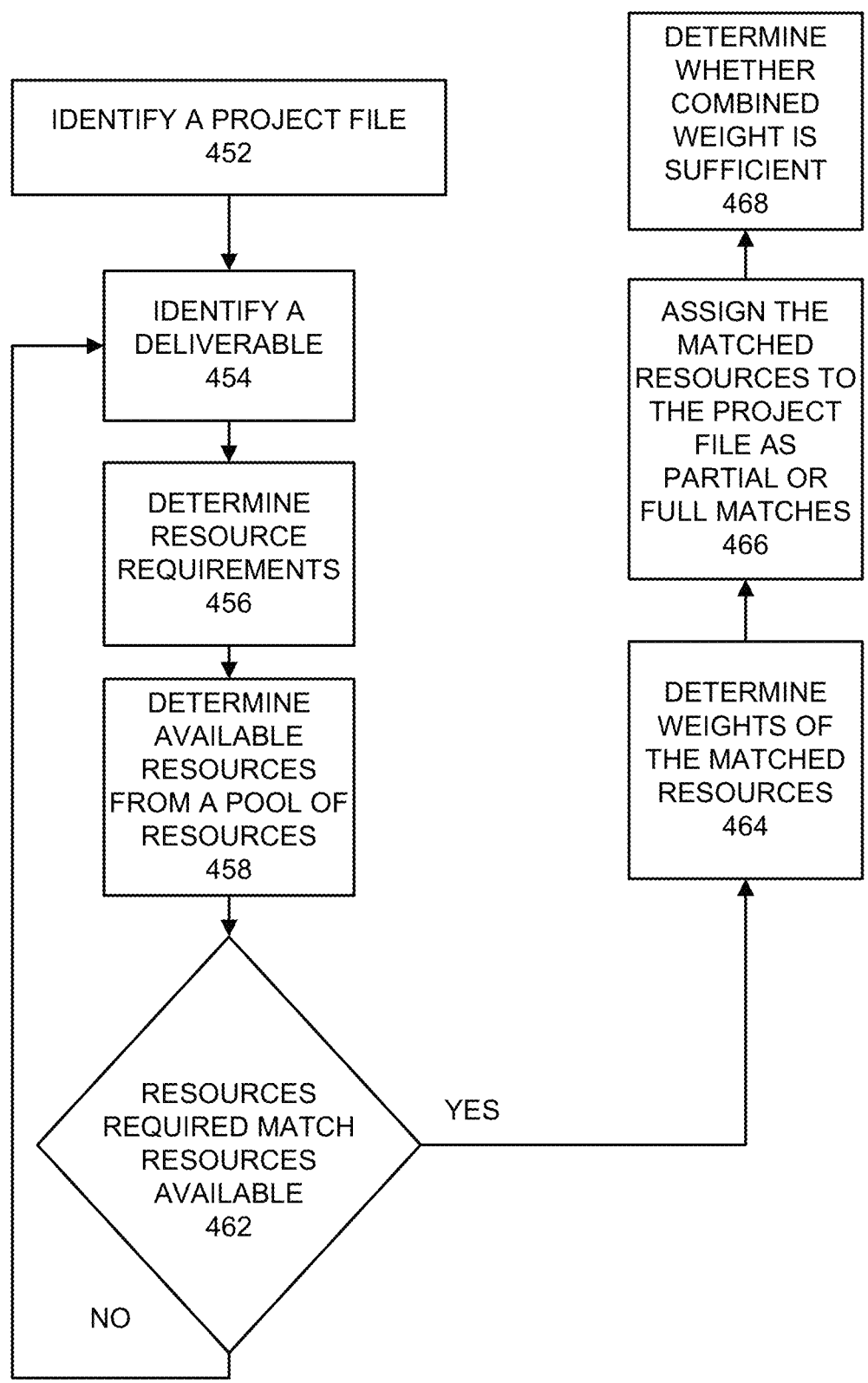
FIG. 4C illustrates an example flow diagram of a project resource management and allocation configuration according to example embodiments.

FIG. 4C illustrates an example flow diagram of a project resource management and allocation configuration according to example embodiments. Referring to FIG. 4C, the example method 450 may include identifying resources from a pool of available resources and an assignment of resources to a project including exact and partial matches, which is performed by ranking resources and weighting resources for a combined project weight score. The higher the score the higher a likelihood of success of the project. The method may include identifying a project file stored in a database 452, the project file may be registered to an organization. The method may also include identifying a deliverable assigned to the project file, where the deliverable includes deliverable requirements 454. The method may also include determining resource requirements including types of resources and an amount of resources required to achieve the deliverable requirements 456, determining available resources at the registered organization from a pool of resources 458, comparing the available resources to the resource requirements and identifying whether there are available matches from available resources which match the types of resource requirements 462. The method may also include determining the weights of the matched resources 464 for increased project scoring accuracy, higher weighted resources cause for higher scoring assignments. The method may also include assigning each of the available matches to the project file as full matches or partial matches depending on a weight assigned to each of the available matches 466. A determination is made as to whether the combined weight of the resources is sufficient to provide a sufficient threshold project score 468 (e.g., 80 out of a 100).

The deliverable requirements may include a deadline and a numerical value output requirement (e.g., 10,000 lines of code, 100 units of output). The full matches may include a higher weight (4-5) assigned to the type of the available resource and the amount of the available resource than the partial matches which may have smaller score weights (e.g., 1-3). The example method may include, responsive to the assigning of each of the available matches to the project file, determining whether a combined weight value of the available matches is greater than or equal to a predetermined success threshold, and when the combined weight value is greater than or equal to a predetermined success threshold, updating the project file to an active status. The method may also include responsive to the assigning of each of the available matches to the project file, determining whether a combined weight value of the available matches is greater than or equal to a predetermined success threshold, and when the predetermined success threshold is not greater than or equal to a predetermined success threshold, reassigning one or more resources to the project file from another project file that is currently without assigned failures, and updating the project file to an active status. The available resources include one or more of available persons with assigned skill types, workstations, manufacturing machines, and floor space.

Figure 4D:
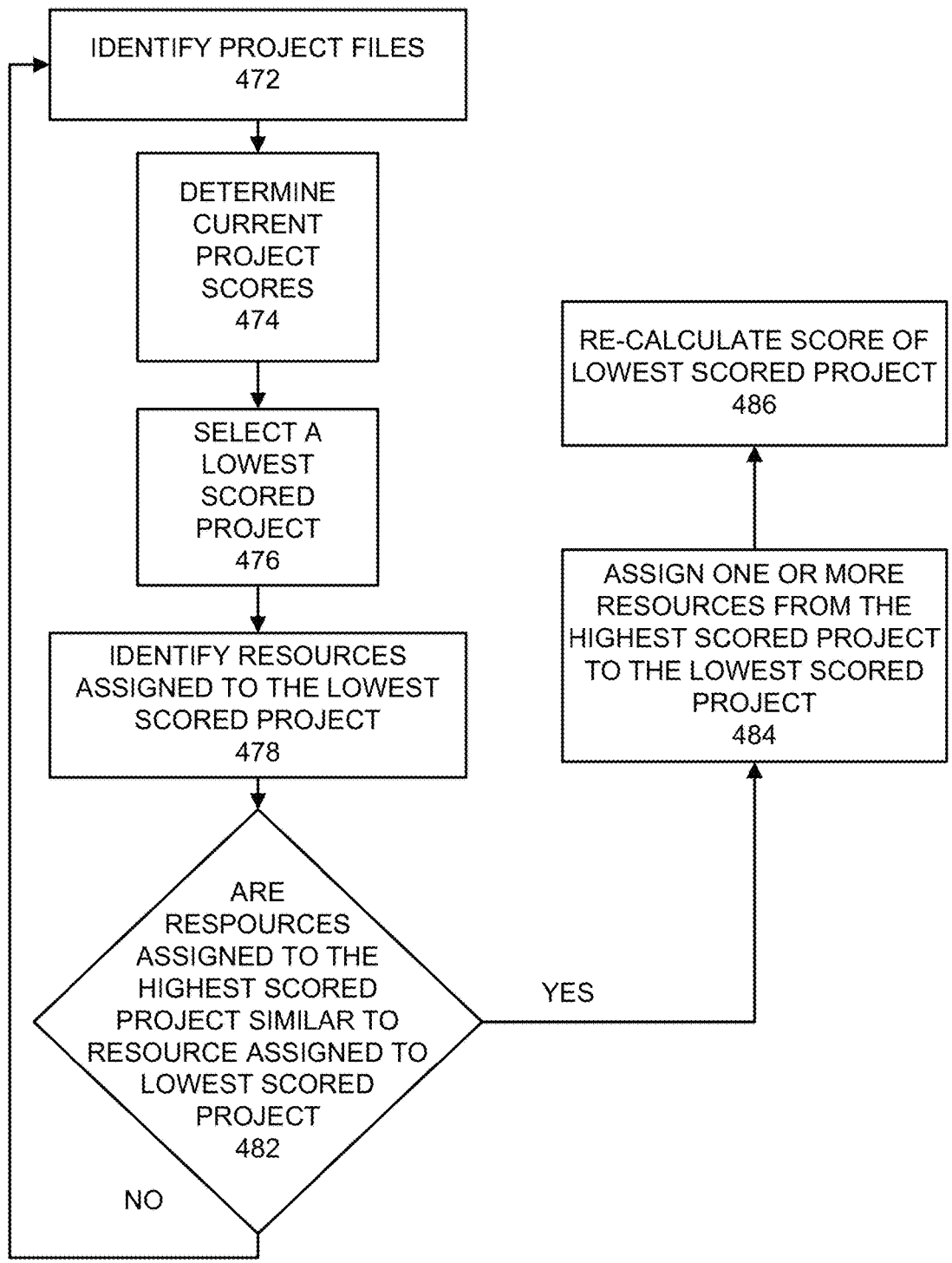
FIG. 4D illustrates an example flow diagram of a project scoring and comparison configuration according to example embodiments.

FIG. 4D illustrates an example flow diagram of a project scoring and comparison configuration according to example embodiments. Referring to FIG. 4D, the method 470 may include comparing active projects via their respective project scores and removing all excess resources and reassigning those resources to projects with weaker scores to provide optimal project management at a particular organization that owns those projects. The example method may include identifying a plurality of project files stored in a database 472, determining current project scores assigned to the plurality of project files 474, selecting a lowest scored project file with a lowest assigned project score 476, identifying one or more types of resources assigned to the project file with the lowest score 478, and identifying the highest scored project file and the types of resources assigned to the highest scored project file. The method may also include determining whether any of the types of resources assigned to the highest scored project file match any of the types of resources assigned to lowest scored project, and when one or more types of resources assigned to the highest scored project file match 482 the types of resources assigned to the lowest scored project, the method may include assigning one or more of the matched resources of the highest scored project file to the lowest scored project 484. The scores may then be recalculated 486 for the lowest project and/or all projects which have undergone a change in resources.

The method may also include identifying one or more deliverables assigned to the lowest scored project file, and the one or more deliverables may include a deadline date and a numerical value output requirement. The method may also include determining the one or more matched resources, assigned to the lowest scored project file from the highest scored project file, increases a likelihood of completing the lowest scored project file by the deadline. The method may also provide determining a new score to assign to the lowest scored project based on the increased likelihood of completing the lowest scored project file by the deadline. The numerical value output requirement includes at least one of a number of units and a specific number of software code lines. The method may also include determining a new score to assign to the highest scored project based on lost resources resulting from the assigning of the one or more of the matched resources of the highest scored project file to the lowest scored project. The types of resources include one or more of assigned skill types, workstations, manufacturing machines, and floor space.

One embodiment may include identifying various projects that were previously completed, then, comparing one or more current projects to the previously completed projects which included success and failure. The key parameter is the weighted element of one or more resources and the risk metrics that need to be calculated, the risk metrics are categorized, such as a risk metric for a low budget, a risk metric for enough senior coders, and a risk metric for a deadline, too soon, etc. This enables project grading and ultimately re-shuffling during risk assessment.

One example method may include identifying a plurality of project files in a database, identifying one or more active project files and one or more inactive project files from the plurality of project files, retrieving one or more of the inactive project files, identifying one or more project risk metrics associated with the one or more inactive project files, and determining potential project risk metrics associated with the one or more active project files based on the one or more project risk metrics associated with the one or more inactive project files.

The method may also include identifying a category of the one or more project risk metrics, and comparing the identified category to a category of the one or more potential project risk metrics. The method may also include determining a threshold associated with the identified category that is within a predefined range of a threshold associated with the category of the one or more potential project risk metrics, and responsive to determining the threshold associated with the identified category is within a predefined range of the threshold associated with the category of the one or more potential project risk metrics, designating the one or more potential project risk metrics as an actual project risk metric. The method may also include selecting one or more of the active project files, other than the active project file that comprises the actual project risk metric, and selecting one or more resources from the selected one or more active project files to reassign to the active project file that include the actual project risk metric. The method may also include removing the one or more resources from the selected one or more active project files, and reassigning the one or more resources to the active project file that comprises the actual project risk metric. The plurality of project files include one or more of each of a deadline and a deliverable. The inactive project files are previously completed projects having at least one of one or more completed deliverables and one or more uncompleted deliverables.

Another example embodiment includes Building taking a set of active projects, and stress testing them until results are demonstrated, this could include using older projects and known failure baselines as a basis and just established rules that have thresholds and ranges of values that are known not to work, such as a certain type of software project requirement (lines of code estimated, tasks, etc.) and a certain turnaround deadline 120 days, etc. The failures are noted and the associated projects are used to alleviate one another until the one in question is rearranged and ready for success.

The example method may include identifying a plurality of active project files in a database, identifying one or more deliverables included in the plurality of active project files, performing a simulation test based on a current set of allocated resources and a current set of deadlines associated with each of the one or more deliverables to determine whether the one or more deliverables will fail, determining the one or more deliverables comprises one or more failed project risk metrics indicating that the one or more deliverables will fail to be completed by a corresponding deadline among the current set of deadlines, selecting one or more of the active project files which does not have a failed project risk metric, and reallocating resources, from the one or more of the active project files which does not have a failed project risk metric, to one or more of the active project files which has one or more failed project risk metrics. The performing a simulation test based on a current set of allocated resources and a current set of deadlines associated with each of the one or more deliverables includes determining a threshold to assign to the one or more deliverables based on a work value assigned to the deliverable and a deadline assigned to the deliverable. The threshold includes a function of the work value assigned to the deliverable and a number of days until the deadline. The method may include comparing the threshold to a known threshold stored in memory, and the known threshold includes a maximum success value identified from a previous deliverable associated with a previously completed project. When the threshold is less than or equal to the known threshold, determining the deliverable has a successful project risk metric. When the threshold is greater than the known threshold, determining the deliverable has an unsuccessful project risk metric, and the work value assigned to the deliverable includes a number of units and a number of lines of software code, and wherein the deadline assigned to the deliverable comprises a fixed number of days from the current date.

Another example embodiment includes an assignment of resources to a project including exact and partial matches, this is performed by ranking resources and weighting resources for a combined project weight score. The higher the score the better-off the project. The method may include identifying a project file stored in a database, the project file being registered to an organization, identifying a deliverable assigned to the project file, and the deliverable includes deliverable requirements, determining resource requirements including types of resources and an amount of resources required to achieve the deliverable requirements, determining available resources at the registered organization from a pool of resources, comparing the available resources to the resource requirements, identifying available matches from available resources which match the types of resource requirements, and assigning each of the available matches to the project file as full matches or partial matches depending on a weight assigned to each of the available matches. The deliverable requirements include a deadline and a numerical value output requirement. The numerical value output requirement includes at least one of a number of units and a number of software code lines. The full matches include a higher weight assigned to the type of the available resource and the amount of the available resource than the partial matches. Responsive to the assigning of each of the available matches to the project file, determining whether a combined weight value of the available matches is greater than or equal to a predetermined success threshold, and when the combined weight value is greater than or equal to a predetermined success threshold, updating the project file to an active status. The method may also include responsive to the assigning of each of the available matches to the project file, determining whether a combined weight value of the available matches is greater than or equal to a predetermined success threshold, and when the predetermined success threshold is not greater than or equal to a predetermined success threshold, reassigning one or more resources to the project file from another project file that is currently without assigned failures, and updating the project file to an active status. The available resources include one or more of available persons with assigned skill types, workstations, manufacturing machines, and floor space.

Another example embodiment may include comparing active projects across the entire organization, removing all excess resources and reassigning those resources to projects with weaker scores than those with the excess resources. The method may include identifying a plurality of project files stored in a database, determining current project scores assigned to the plurality of project files, selecting a lowest scored project file with a lowest assigned project score, identifying one or more types of resources assigned to the project file with the lowest score, identifying the highest scored project file and the types of resources assigned to the highest scored project file, determining whether any of the types of resources assigned to the highest scored project file match any of the types of resources assigned to lowest scored project, and when one or more types of resources assigned to the highest scored project file match the types of resources assigned to the lowest scored project, assigning one or more of the matched resources of the highest scored project file to the lowest scored project.

The method may also include identifying one or more deliverables assigned to the lowest scored project file, wherein the one or more deliverables include a deadline date and a numerical value output requirement. The method may also include determining the one or more matched resources, assigned to the lowest scored project file from the highest scored project file, increases a likelihood of completing the lowest scored project file by the deadline. The method may also include determining a new score to assign to the lowest scored project based on the increased likelihood of completing the lowest scored project file by the deadline. The numerical value output requirement includes at least one of a number of units and a specific number of software code lines. The method may also include determining a new score to assign to the highest scored project based on lost resources resulting from the assigning of the one or more of the matched resources of the highest scored project file to the lowest scored project. The types of resources include one or more of assigned skill types, workstations, manufacturing machines, and floor space.

Figure 5:
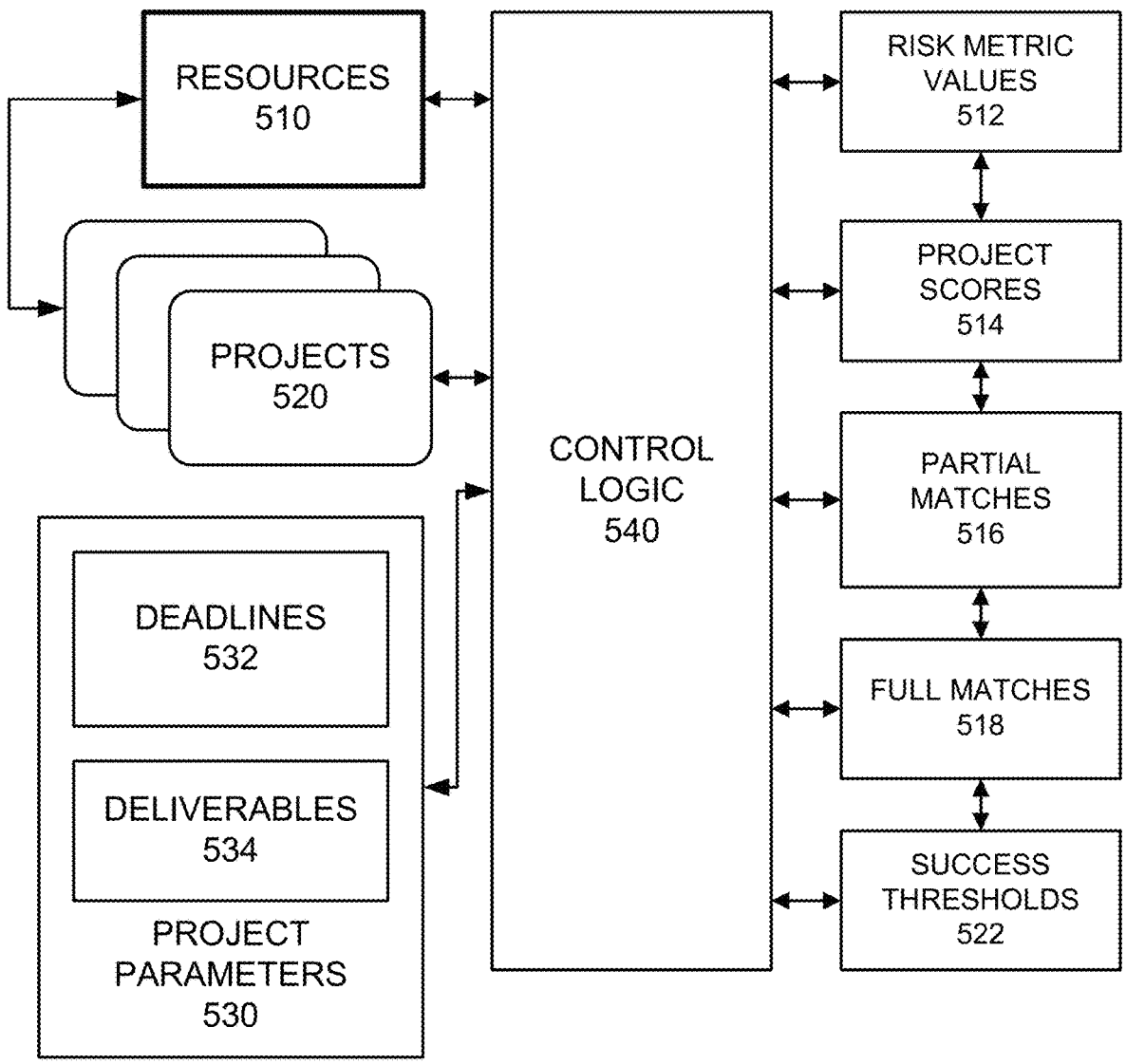
FIG. 5 illustrates an example logic control module configured to perform project parameter input and output management according to example embodiments.

FIG. 5 illustrates an example logic control module configured to perform project parameter input and output management according to example embodiments. Referring to FIG. 5, the example configuration 500 includes a control logic module 540 which is responsible for processing the input data, such as resources 510, projects 520 and certain project parameters 530, including but not limited to deadlines 532, deliverables 534, etc. and providing certain outputs. The example outputs may include calculated risk metric values 512, project scores 514, partial matches 516, full matches 518 and success thresholds 522. The output data can be used to predict project failures and seek to optimize those projects requiring optimization and additional resources.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components. For example, FIG. 6 illustrates an example network element 600, which may represent any of the above-described network components of the other figures.

Figure 6:
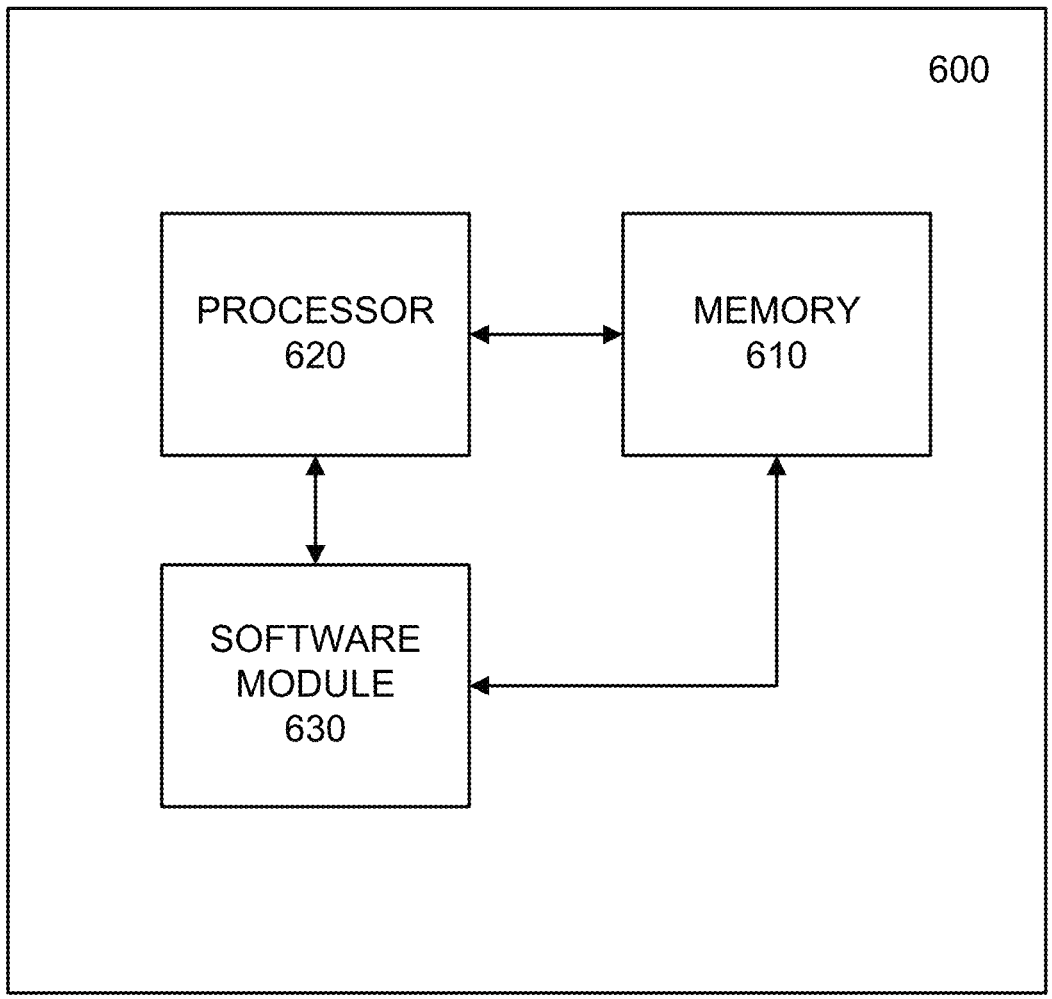
FIG. 6 illustrates an example network entity device configured to store instructions, software, and corresponding hardware for executing the same, according to example embodiments of the present application.

As illustrated in FIG. 6, a memory 610 and a processor 620 may be discrete components of the network entity 600 that are used to execute an application or set of operations. The application may be coded in software in a computer language understood by the processor 620, and stored in a computer readable medium, such as, the memory 610. The computer readable medium may be a non-transitory computer readable medium that includes tangible hardware components in addition to software stored in memory. Furthermore, a software module 630 may be another discrete entity that is part of the network entity 600, and which contains software instructions that may be executed by the processor 620. In addition to the above noted components of the network entity 600, the network entity 600 may also have a transmitter and receiver pair configured to receive and transmit communication signals (not shown).

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the system of the various figures can be performed by one or more of the modules or components described herein or in a distributed architecture and may include a transmitter, receiver or pair of both. For example, all or part of the functionality performed by the individual modules, may be performed by one or more of these modules. Further, the functionality described herein may be performed at various times and in relation to various events, internal or external to the modules or components. Also, the information sent between various modules can be sent between the modules via at least one of: a data network, the Internet, a voice network, an Internet Protocol network, a wireless device, a wired device and/or via plurality of protocols. Also, the messages sent or received by any of the modules may be sent or received directly and/or via one or more of the other modules.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, or the like.

A module may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module. Further, modules may be stored on a computer-readable medium, which may be, for instance, a hard disk drive, flash device, random access memory (RAM), tape, or any other such medium used to store data.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
executing a computer-implemented simulation to quantify a likelihood of failure of an active project file within a project management software application, the computer-implemented simulation including stress testing the active project file in accordance with operations that include:
identifying attributes of an active project from within contents of the active project file and identifying attributes of an inactive project from within contents of an inactive project file within the project management software application,
determining that an identified category attribute of the active project identified from the active project file corresponds to an identified category attribute of the inactive project identified from the inactive project file,
dynamically setting thresholds for the identified attributes of the active project based on values of the identified attributes of the inactive project file,
determining that the active project is at risk of failure based on a comparison of the identified attributes from the active project file with the thresholds dynamically set based on the values of the identified attributes from the inactive project file, and
dynamically reallocate a resource from another active project that has less of a risk of failure to the active project within the active project file via the project management software application to reduce a likelihood of the risk of failure of the active project.

2. The method of claim 1, wherein the determining that the active project is at risk of failure includes:
determining that the identified attributes of the active project are within a predefined range of the thresholds dynamically set based on the values of the identified attributes from the inactive project file.

3. The method of claim 1, wherein the method further comprises changing a deadline of a deliverable of the active project based on a deadline of a similar deliverable identified from the inactive project file.

4. The method of claim 1, wherein the inactive project file corresponds to a previously completed project.

5. An apparatus, comprising:
a memory that stores project files of a project management software application in a database; and
a processor configured to execute a computer-implemented simulation to quantify a likelihood of failure of an active project file within the project management software application, the computer-implemented simulation including stress testing the active project file in accordance with operations that include:
identify attributes of an active project from within contents of the active project file and identifying attributes of an inactive project from within contents of an inactive project file within the project management software application,
determine that an identified category attribute of the active project identified from the active project file corresponds to an identified category attribute of the inactive project identified from the inactive project file,
dynamically set thresholds for the identified attributes of the active project based on values of the identified attributes of the inactive project file,
determine that the active project is at risk of failure based on a comparison of the identified attributes from the active project file with the thresholds dynamically set based on the values of the identified attributes from the inactive project file, and
dynamically reallocate a resource from another active project that has less of a risk of failure to the active project within the active project file via the project management software application to reduce a likelihood of the risk of failure of the active project.

6. The apparatus of claim 5, wherein the processor is further configured to determine that the identified attributes of the active project are within a predefined range of the thresholds dynamically set based on the values of the identified attributes from the inactive project file.

7. The apparatus of claim 5, wherein the processor is further configured to change a deadline of a deliverable of the active project based on a deadline of a similar deliverable identified from the inactive project file.

8. The apparatus of claim 5, wherein the inactive project file corresponds to a previously completed project.

9. A non-transitory computer readable storage medium configured to store instructions that when executed cause a processor to perform a method comprising:
executing a computer-implemented simulation to quantify a likelihood of failure of an active project file within a project management software application, the computer-implemented simulation including stress testing the active project file in accordance with operations that include:
identifying attributes of an active project from within contents of the active project file and identifying attributes of an inactive project from within contents of an inactive project file within the project management software application,
determining that an identified category attribute of the active project identified from the active project file corresponds to an identified category attribute of the inactive project identified from the inactive project file,
dynamically setting thresholds for the identified attributes of the active project based on values of the identified attributes of the inactive project file,
determining that the active project is at risk of failure based on a comparison of the identified attributes from the active project file with the thresholds dynamically set based on the values of the identified attributes from the inactive project file, and
dynamically reallocating a resource from another active project that has less of a risk of failure to the active project within the active project file via the project management software application to reduce a likelihood of the risk of failure of the active project.

10. The non-transitory computer readable storage medium of claim 9, wherein the determining that the active project is at risk of failure includes:
determining that the identified attributes of the active project are within a predefined range of the thresholds dynamically set based on the values of the identified attributes from the inactive project file.

11. The non-transitory computer readable storage medium of claim 9, wherein the method further comprises changing a deadline of a deliverable of the active project based on a deadline of a similar deliverable identified from the inactive project file.

* * * * *